United States Patent [19]

Minoura et al.

[11] 4,226,500
[45] Oct. 7, 1980

[54] SCANNING OPTICAL SYSTEM WITH REFLECTIVE LENS

[75] Inventors: Kazuo Minoura, Yokohama; Masamichi Tateoka, Kawasaki, both of Japan

[73] Assignee: Canon Kabushiki Kaisha, Tokyo, Japan

[21] Appl. No.: 967,397

[22] Filed: Dec. 7, 1978

[30] Foreign Application Priority Data

Dec. 7, 1977 [JP] Japan .................. 52/146963

[51] Int. Cl.$^2$ ............... G02B 27/17; G02B 17/08
[52] U.S. Cl. .................. 350/6.1; 350/6.8; 350/201
[58] Field of Search ............ 350/6.1–6.91, 350/201, 199, 200

[56] References Cited

U.S. PATENT DOCUMENTS

| | | | |
|---|---|---|---|
| 3,520,586 | 7/1970 | Bousky | 350/199 |
| 3,667,360 | 6/1972 | Vicik | 350/201 |
| 3,873,180 | 3/1975 | Bousky | 350/6.8 |

*Primary Examiner*—Jon W. Henry
*Attorney, Agent, or Firm*—Fitzpatrick, Cella, Harper & Scinto

[57] ABSTRACT

A scanning image forming optical system disposed in a scanning optical system includes a single lens having the both surfaces thereof divided into a light-transmitting area and a light-reflecting area, whereby the scanning optical system is compact and various aberrations in the image forming optical system is improved.

5 Claims, 23 Drawing Figures

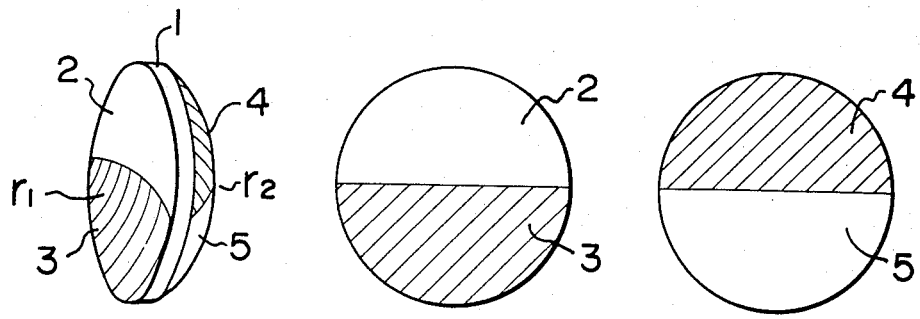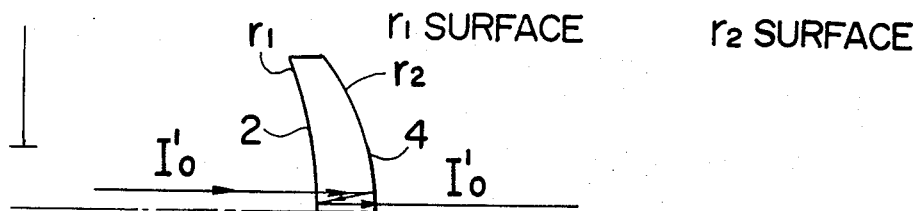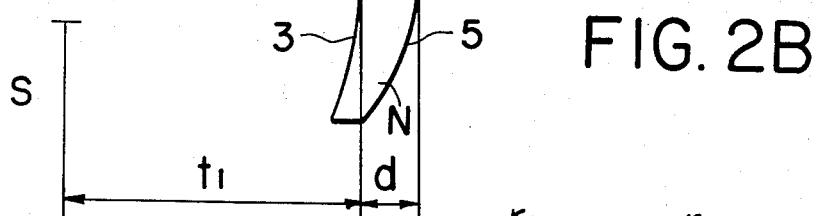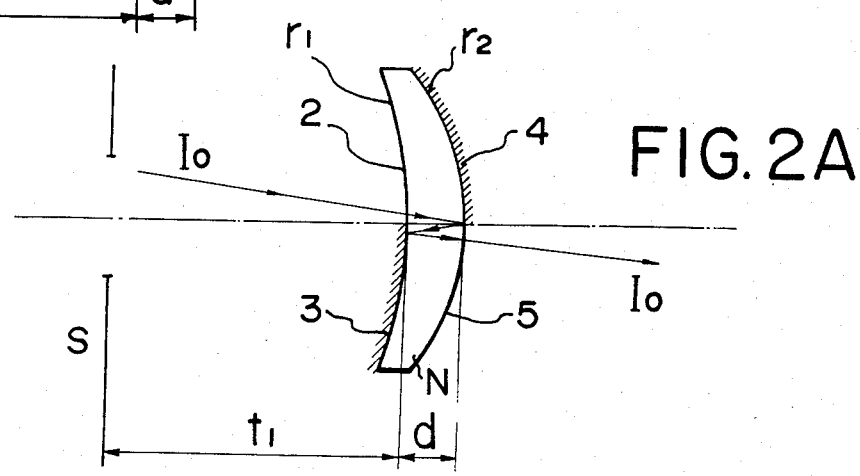

f = 300
t = -120
d = 10 f = 300
t = -150
d = 10

SCANNING OPTICAL SYSTEM WITH REFLECTIVE LENS

BACKGROUND OF THE INVENTION

1. Field of the Invention

This invention relates to a scanning optical system which is simple in construction and which has an optical system capable of scanning a wide range with a good performance.

2. Description of the Prior Art

These years have seen remarkable improvements in scanning optical systems along with the developments of information processing apparatuses using a light beam. The scanning optical systems are often incorporated in the information processing apparatuses and therefore in order to make the apparatuses compact, it is desirable that simple scanning systems which are excellent in image formation performance be provided.

SUMMARY OF THE INVENTION

It is an object of the present invention to provide a scanning optical system having a simplified scanning image formation lens.

It is a further object of the present invention to provide a scanning optical system which is compact in construction and which has an image formation lens capable of scanning a wide range of surface to be inspected with a good image formation performance.

In the scanning optical system according to the present invention, at least one single lens whose surfaces are both divided into a light-transmitting area and a light-reflecting area is disposed in a scanning lens system disposed with the scanning system. More specifically, a single lens having a surface $r_1$ facing deflector means and a surface $r_2$ facing a scanned surface is generally disposed within a scanning lens system disposed between the deflector means and the scanned surface, and the surfaces $r_1$ and $r_2$ each comprises a light-transmitting portion and a light-reflecting portion. A light beam passed through the light-transmitting portion of the surface $r_1$ into the interior of the lens is reflected by the light-reflecting portion of the surface $r_2$ and then reflected by the light-reflecting portion of the surface $r_1$, whereafter the light beam passes through the light-transmitting portion of the surface $r_2$ outwardly of the lens.

In the scanning optical system according to the present invention, the optic axis of the single lens may be parallel to or may form a predetermined angle with a deflection surface formed with time by the light beam deflected by the deflector. In the latter case, namely, where the optic axis forms a predetermined angle with the deflection surface, the surface formed by the beam leaving the single lens is usually conical. Therefore, to correct the conical scanning surface created by the single lens, the surface of the beam entering the single lens is made conical to offset the conical scanning surface created by the single lens or two or more such single lenses are disposed to offset the conical effect produced by the individual single lenses; whereby the beam finally scanning the scanned surface may be planar. Further, the optic axis of a usual lens disposed with the single lens may be distinct from the optic axis of the single lens even if it is coaxial with the latter.

In the scanning optical system according to the present invention, the single lens included in the above-described scanning image formation lens may desirably be a plano-convex lens having its convex surface facing the scanned surface or a meniscus lens having its convex surface also facing the scanned surface, in terms of aberration correction.

Further, in the scanning optical system according to the present invention, the single lens included in the scanning image formation lens has a reflecting surface unlike the ordinary lens which comprises only a light-transmitting surface and therefore, there occurs a phenomenon that a light beam travels through the lens in a direction opposite to the direction of incidence. This is equivalent to the fact that the light beam passes through a medium of refractive index-N (N is the refractive index of the image formation lens). Such a negative refractive index is a physical quantity which could not be obtained in a usual lens system, and such a lens construction leads to an excellent effect in aberration correction. Further, such a lens construction leads to obtainment of linearity and uniform speed of the scanning beam on the scanned surface which has been difficult to correct in the conventional light-transmitting single lens.

The invention will become more fully apparent from the following detailed description thereof taken in conjunction with the accompanying drawings.

BRIEF DESCRIPTION OF THE DRAWINGS

FIGS. 1(A), (B) and (C) show an embodiment of the scanning image formation lens according to the present invention.

FIGS. 2(A) and (B) illustrate the scanning image formation lens according to the present invention.

DESCRIPTION OF THE PREFERRED EMBODIMENTS

Figure 3A:
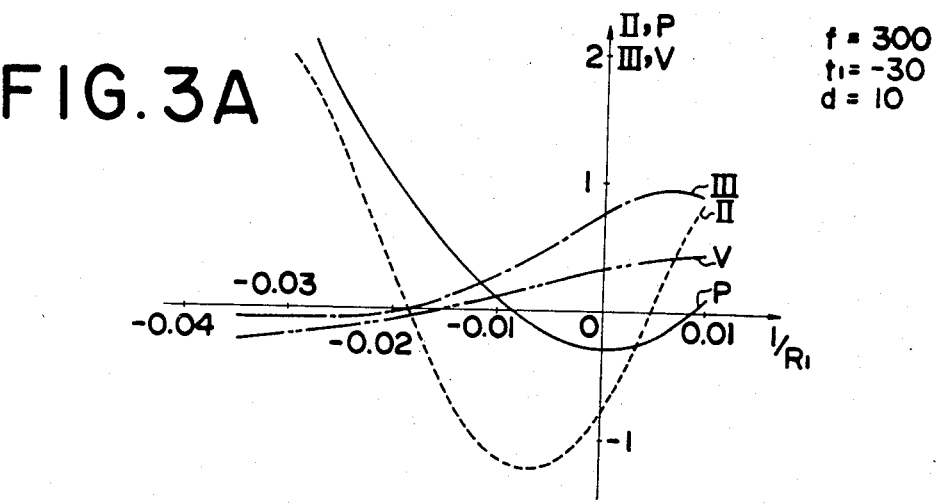
FIGS. 3(A), (B), (C), (D) and (E) illustrate the relationships between variations in shape of the scanning image formation lens according to the present invention and various aberrations.
Figure 3B:
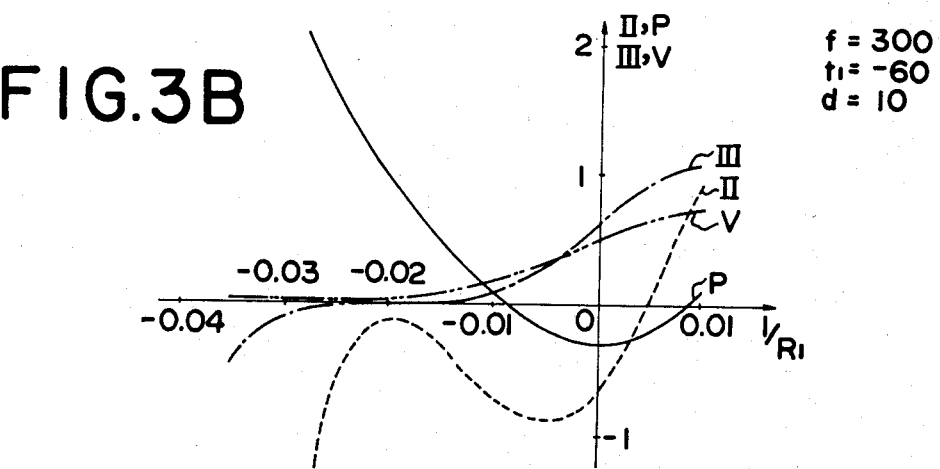
Figure 3C:
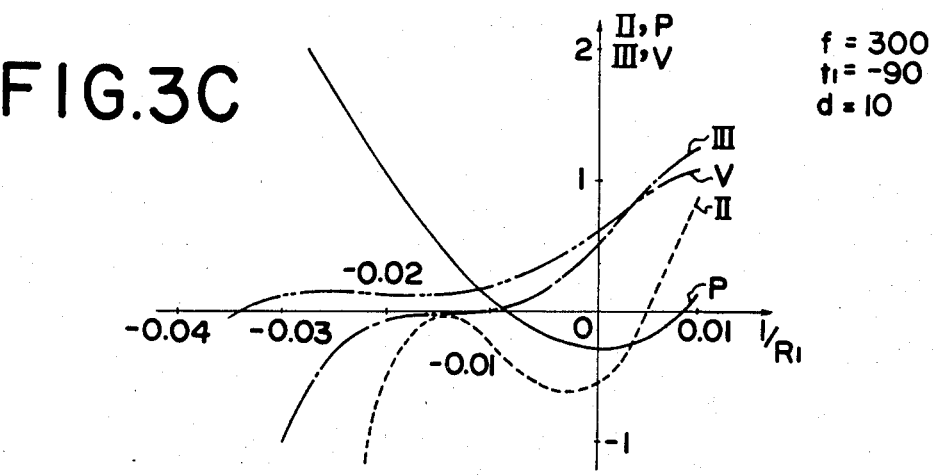
Figure 3D:
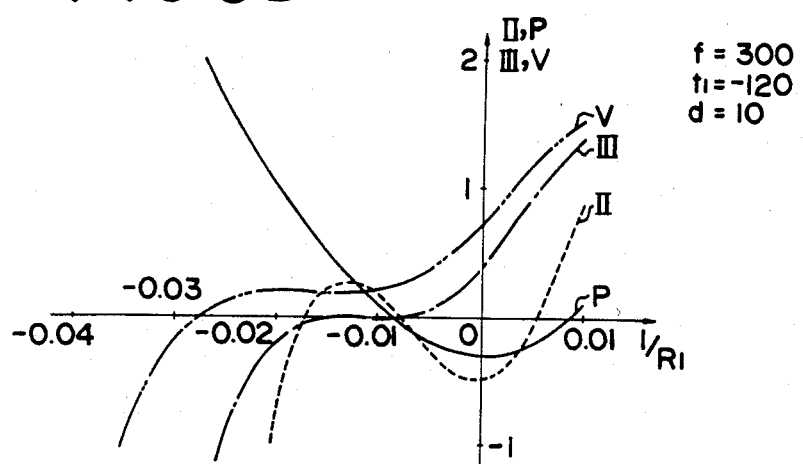
Figure 3E:
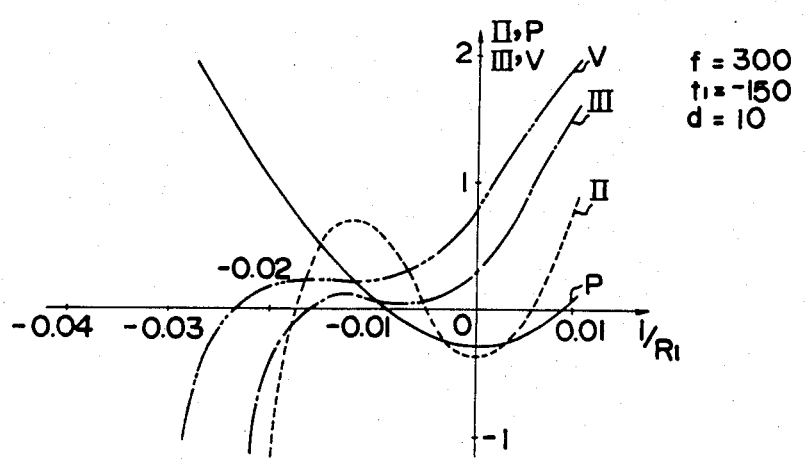
Figure 4A:
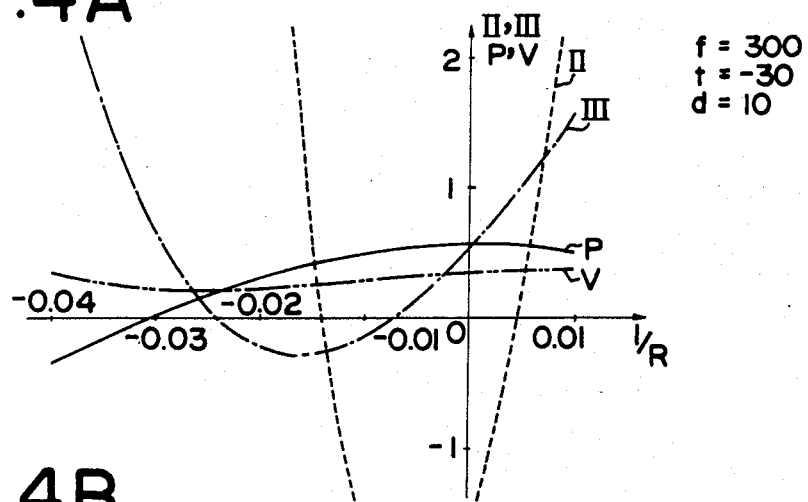
FIGS. 4(A), (B), (C), (D) and (E) illustrate the relationships between variations in shape of the conventional single lens and various aberrations.
Figure 4B:
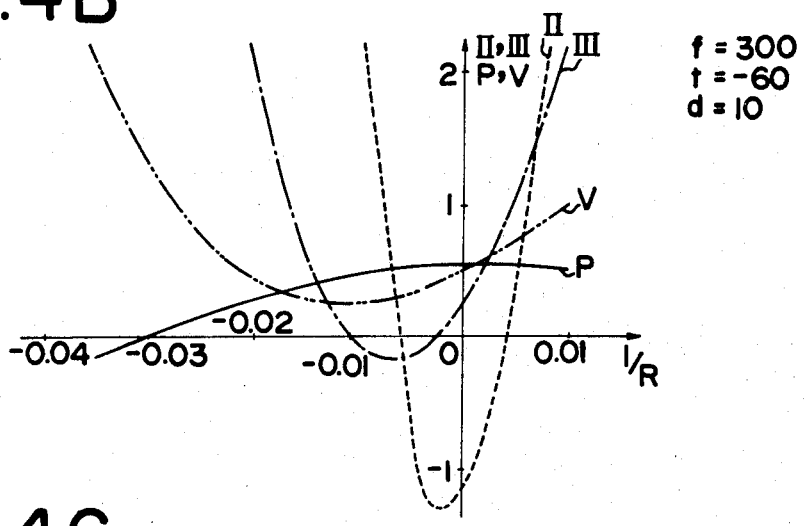
Figure 4C:
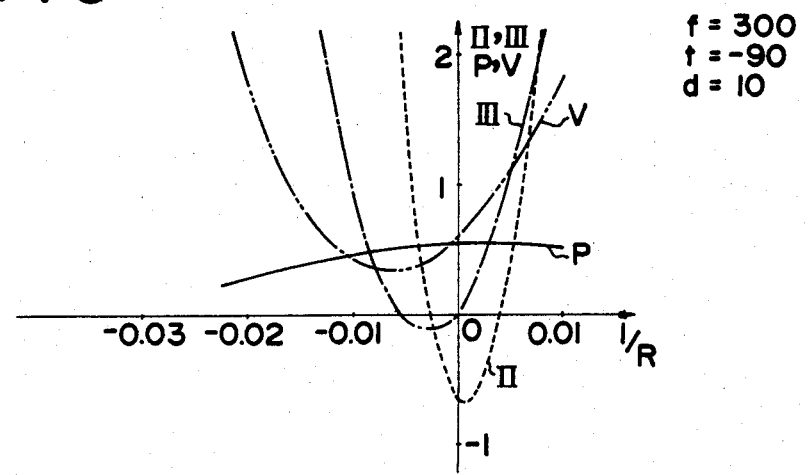
Figure 4D:
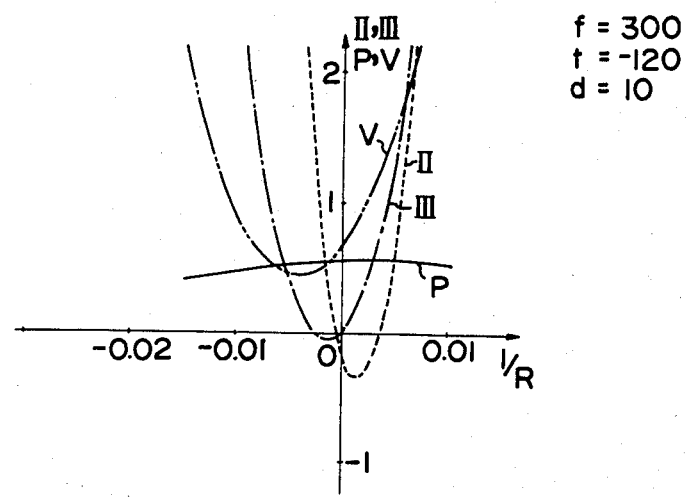
Figure 4E:
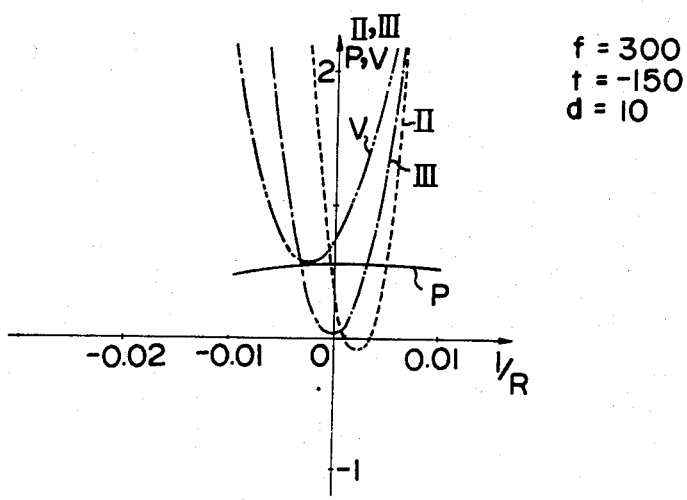

Referring to FIGS. 1(A), (B) and (C) which show an embodiment of the scanning single lens used with the image formation lens system of the scanning optical system of the present invention, FIG. 1(A) is a perspective view of the lens, FIG. 1(B) is a front view of the lens as seen from the surface $r_1$, and FIG. 1(C) is a front view as seen from the surface $r_2$. As shown in FIG. 1, the scanning single lens 1 has surfaces $r_1$ and $r_2$. The surface $r_1$ is bisected into a light-transmitting area 2 and a light-reflecting area 3, and the surface $r_2$ is also bisected into a light-transmitting area 5 and a light-reflector area 4. In this embodiment, the light-transmitting area 2 of the surface $r_1$ is opposed to the light-reflecting area 4 of the surface $r_2$, and the light-reflecting area 3 of the surface $r_1$ is opposed to the light-transmitting area 5 of the surface $r_2$.

FIG. 2(A) shows the manner in which a light beam passes through the lens 1 of FIG. 1. The incident light $I_o$ first enters the light-transmitting area 2 of the surface $r_1$, where it is refracted and passed to reach the reflecting area 4 of the surface $r_2$. The light is reflected thereby, whereafter it is again reflected by the reflecting area 3 of the surface $r_1$ and directed toward the transmitting area 5 of the surface $r_2$, where it is refracted and passed. In FIG. 2, S denotes the entrance pupil of the lens 1, t is the axial distance between the entrance pupil S and the surface $r_1$, and d designates the axial thickness of the lens 1.

The Petzval sum P of such a lens 1 which is an aberration coefficient related to the curvature of image field is:

$$P_o = \frac{N-3}{N} \left( \frac{1}{R_1} - \frac{1}{R_2} \right) \qquad (1)$$

where N is the refractive index of the lens 1, and $R_1$ and $R_2$ are the radii of curvature of the surfaces $r_1$ and $r_2$, respectively. In equation (1), the refractive index N of the material of the lens is generally $1.4 < N < 1.9$ and thus, if $(1/R_1 - 1/R_2) \geq 0$, $P \leq 0$. In constrast, the Petzval sum $P_o$ of a single lens whose opposite surfaces are formed as light-transmitting surfaces alone unlike the lens 1 is expressed as:

$$P_o = \frac{N-1}{N} \cdot \left( \frac{1}{R_1} - \frac{1}{R_2} \right) \qquad (2)$$

In equation (2), if $(1/R_1 - 1/R_2) \geq 0$, $P_o \geq 0$ and this is converse to the case of the present invention.

In case of a light-transmitting single lens, when the Petzval sum $P_o=0$, $R_1 = R_2 (=R)$ and if the focal length of this lens is f, the radius of curvature R of each surface is $$R = \pm \sqrt{\frac{d \cdot f}{N}} \cdot (N-1) \qquad (3)$$

where d is the thickness of the lens.

As is clear from this equation (3), when the thickness d of the lens is small, the radius of curvature R of each surface is small. For example, if the focal length $f=300$ and $N=1.8$ and if $d=10$, then R is given as $R \pm 32$ from equation (3).

In contrast, in the case of the present invention, when the Petzval sum $P_o$ is $P_o=0$, $R_1 = R_2 (=R)$ from equation (1) and if the focal length of this lens is f, the curvature radius R of each surface is given as:

$$R = \pm \frac{2\sqrt{2} \, d(N-1)}{\sqrt{3N^2 - 2N + 3 \pm \sqrt{(3N^2-2N+3)^2 - \frac{16dN(N+1)^2}{f}}}} \qquad (4)$$

where d is sufficiently small in terms of lens designing as compared with f or R. Therefore, if it is taken into consideration that d is sufficiently small and the sign — of the $\pm$ of the denominator in equation (4) is adopted, then equation (4) becomes approximate to $$R \approx \sqrt{\frac{d \cdot f}{N}} \cdot \sqrt{3N^2 - 2N + 3} \qquad (5)$$

For example, if $f=300$ and $N=1.8$ and if $d=10$, then $R \approx \pm 123$. This is a value about 3.8 times the radius of curvature when the Petzval sum of the conventional single lens is zero.

Generally, when equation (5) is compared with equation (3), it is seen how many times the radius of curvature of the conventional lens the radius of curvature of the lens of the present invention is. That is, the radius of curvature of the lens of the present invention is $$\frac{\sqrt{3N^2 - 2N + 3}}{N-1}$$

times the radius of curvature of the conventional lens.

For example, the curvature radius of the lens of the present invention is about 5.2 times when $N=1.5$, and about 3.8 times when $N=1.8$. Even when the value of the refractive index of the conventional lens is 1.8 and that of the lens of the present invention is 1.5, the curvature radius of the lens of the present invention is about 3.2 times that of the conventional lens.

Thus, in the present invention, there is an advantage that the radius of curvature can be great and this is advantageous in correcting coma and astigmatism. FIG. 2(B) is similar to FIG. 2(A) but illustrates the situation wherein the light beam deflected by the scanning means is parallel to the optic axis of the single lens.

Reference is now had to FIGS. 3 and 4 to describe that coma and astigmatism are aggravated if the radius of curvature is smaller. FIGS. 3(A) to 3(E) show the various aberration coefficient curves for variations in shape of the lens system of the present invention having a focal length of 300. The abscissa represents the curvature ($1/R_1$) of the surface $r_1$ (the first surface) and the ordinate represents the values of the various aberration coefficients when the focal length of the lens system is 1. In these Figures, II designates coma, III astigmatism, P the Petzval sum and V the coefficient of distortion aberration. In FIGS. 3(A) to 3(E), the value of the thickness d of the lens shown in FIG. 2 is 10. The above-mentioned various aberrations II, III, P and V are varied by the position of the entrance pupil. If the axial distance between the entrance pupil S and the lens is $t_1$, FIGS. 3(A), 3(B), 3(C), 3(D) and 3(E) show variations in various aberrations for shape variations when $t_1 = -30$, $t_1 = -60$, $t_1 = -90$, $t_1 = -120$ and $t_1 = -150$, respectively. However, the values of $t_1$ measured in the direction from the surface $R_1$ of the lens toward the pupil S are indicated as negative values.

FIGS. 4(A) to 4(E) show variations in various aberrations for the variation in shape of the conventional transmitting single lens having a focal length of 300. As in FIG. 3, the thickness of the lens is $d=10$ and FIGS. 4(A), 4(B), 4(C), 4(D) and 4(E) correspond to $t_1 = -30$, $t_1 = -60$, $t_1 = -90$, $t_1 = -120$ and $t_1 = -150$, respectively.

When the aberrations of the single lens of the present invention shown in FIGS. 3(A) to 3(E) are compared with the aberrations of the conventional single lens shown in FIGS. 4(A) to 4(E), the coma II and astigmatism III when the Petzval sum P is in the vicinity of zero is better in the lens of the present invention than in the conventional single lens. That is, in the lens according to the present invention, if the Petzval sum P is well corrected, the coma II and astigmatism III are also well corrected. In the lens according to the present invention, astigmatism is particularly better than in the conventional lens and it is possible to scan a wider picture plane (field of view) with a good performance.

The system as shown in FIG. 2 wherein the incident light $I_o$ is refracted by the transmitting portion 2 of the first surface and reflected by the reflecting portion 4 of the second surface and then reflected by the reflecting portion 3 of the first surface and thereafter refracted by and passed outwardly through the transmitting portion 5 of the second surface may be developed as shown in Table 1 below.

TABLE 1

| Surface No. | Curvature Radius | Inter-surface Distance | Refractive Index |
|---|---|---|---|
| 1 | (Entrance Pupil) | | |
| 2 | $R_1$ | $t_1$ | 1.0 |
| 3 | $R_2$ | d | N |
| 4 | $R_1$ | −d | −N |
| 5 | $R_2$ | d | N |
| | | | 1.0 |

FIGS. 3A to 3E show the coma, astigmatism, Petzval sum and distortion aberration of such an equivalent lens system plotted for a variation in $R_1$, and the description of these Figures has already been made.

In the above-described lens system, if the focal length of the entire system, the curvature radius $R_1$ of the first surface, the thickness of the lens and the refractive index N of the lens are set, the curvature radius $R_2$ of the second surface is determined in accordance therewith.

Figure 5A:
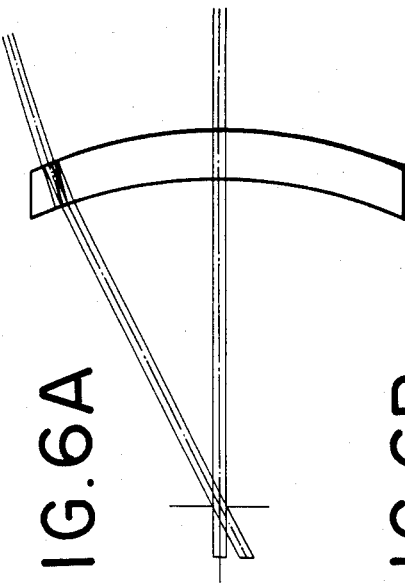
FIGS. 5(A) and (B) and FIGS. 6(A) and (B) illustrate further embodiments of the scanning image formation lens according to the present invention.
Figure 5B:
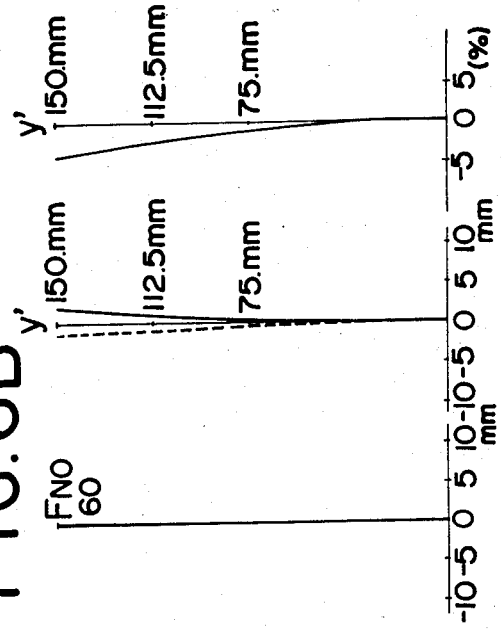
Figure 6A:
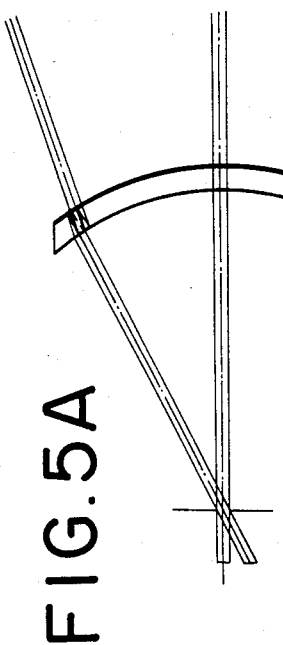
Figure 6B:
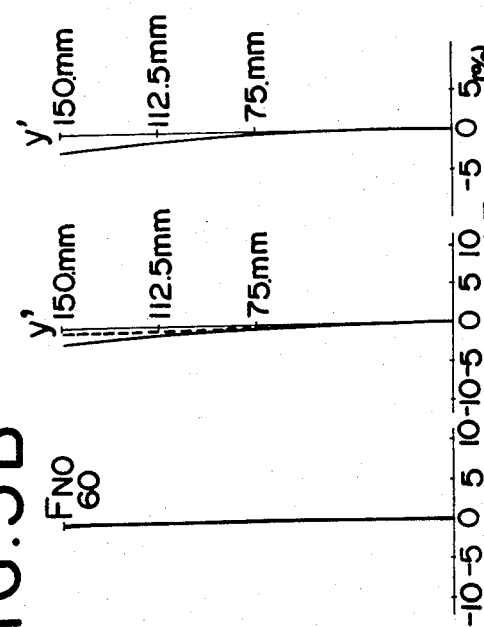
Figure 7:
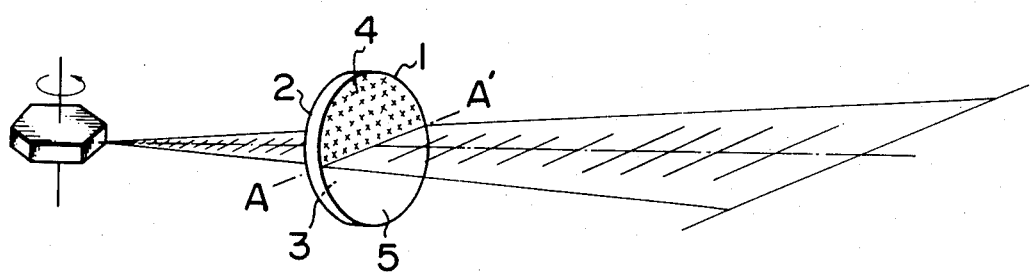
FIG. 7 illustrates the light path shown in FIGS. 5(A) and 6(A).

Table 2 below shows the constructions of the embodiments of the present invention and aberration coefficients (I:spherical aberration, II:coma, III:astigmatism, P:Petzval sum, V:distortion aberration) when the value of the Petzval sum is relatively small. In any of these embodiments, the focal length is 300. FIG. 5(A) shows the light path in a fourteenth embodiment, FIG. 5(B) shows the aberrations in that embodiment, FIG. 6(A) shows the light path in a thirty-first embodiment, and FIG. 6(B) shows the aberrations in that embodiment. The light path shown in FIGS. 5(A) and 6(A) is a light path in the crossection shown in FIG. 7.

TABLE 2

| Parameters | $t_1$ | $R_1$ | $R_2$ | d | N | I | II | III | P | V |
|---|---|---|---|---|---|---|---|---|---|---|
| 1st Embodiment | 30 | −66.667 | −74.786 | 10 | 1.5 | 2.84 | −0.61 | 0.10 | 0.49 | 0.02 |
| 2nd Embodiment | 30 | −100.00 | −103.04 | 10 | 1.5 | 4.36 | −1.14 | 0.28 | 0.09 | 0.11 |
| 3rd Embodiment | 30 | −200.00 | −178.70 | 10 | 1.5 | 3.14 | −1.21 | 0.50 | −0.18 | 0.22 |
| 4th Embodiment | 30 | ∞ | −1,044.3 | 10 | 1.5 | 1.04 | −0.78 | 0.75 | −0.29 | 0.32 |
| 5th Embodiment | 60 | −66.667 | −74.786 | 10 | 1.5 | 2.84 | −0.32 | 0.00 | 0.49 | 0.08 |
| 6th Embodiment | 60 | −100.00 | −103.04 | 10 | 1.5 | 4.36 | −0.70 | 0.09 | 0.09 | 0.18 |
| 7th Embodiment | 60 | −200.00 | −178.70 | 10 | 1.5 | 3.14 | −0.89 | 0.29 | −0.18 | 0.32 |
| 8th Embodiment | 60 | ∞ | −1,044.3 | 10 | 1.5 | 1.04 | −0.68 | 0.60 | −0.29 | 0.49 |
| 9th Embodiment | 90 | −66.667 | −74.786 | 10 | 1.5 | 2.84 | −0.04 | −0.03 | 0.49 | 0.12 |
| 10th Embodiment | 90 | −100.00 | −103.04 | 10 | 1.5 | 4.36 | −0.27 | −0.01 | 0.09 | 0.20 |
| 11th Embodiment | 90 | −200.00 | −178.70 | 10 | 1.5 | 3.14 | −0.58 | 0.15 | −0.18 | 0.36 |
| 12th Embodiment | 90 | ∞ | −1,044.3 | 10 | 1.5 | 1.04 | −0.57 | 0.48 | −0.29 | 0.62 |
| 13th Embodiment | 120 | −66.667 | −74.786 | 10 | 1.5 | 2.84 | −0.24 | −0.01 | 0.49 | 0.17 |
| 14th Embodiment | 120 | −100.00 | −103.04 | 10 | 1.5 | 4.36 | 0.17 | −0.01 | 0.09 | 0.20 |
| 15th Embodiment | 120 | −200.00 | −178.70 | 10 | 1.5 | 3.14 | −0.27 | 0.06 | −0.18 | 0.38 |
| 16th Embodiment | 120 | ∞ | −1,044.3 | 10 | 1.5 | 1.04 | −0.47 | 0.37 | −0.29 | 0.72 |
| 17th Embodiment | 150 | −66.667 | −74.786 | 10 | 1.5 | 2.84 | 0.53 | 0.07 | 0.49 | 0.22 |
| 18th Embodiment | 150 | −100.00 | −103.04 | 10 | 1.5 | 4.36 | 0.61 | 0.06 | 0.09 | 0.21 |
| 19th Embodiment | 150 | −200.00 | −178.70 | 10 | 1.5 | 3.14 | 0.05 | 0.04 | −0.18 | 0.37 |
| 20th Embodiment | 150 | ∞ | −1,044.3 | 10 | 1.5 | 1.04 | −0.37 | 0.29 | −0.29 | 0.79 |
| 21st Embodiment | 30 | −100.00 | −114.82 | 20 | 1.5 | 1.91 | −0.57 | 0.15 | 0.39 | 0.03 |
| 22nd Embodiment | 30 | −200.00 | −189.47 | 20 | 1.5 | 2.32 | −0.94 | 0.41 | −0.08 | 0.21 |
| 23rd Embodiment | 30 | ∞ | −1,038.4 | 20 | 1.5 | 0.98 | −0.72 | 0.68 | −0.29 | 0.39 |
| 24th Embodiment | 60 | −100.00 | −114.82 | 20 | 1.5 | 1.91 | −0.37 | 0.05 | 0.39 | 0.10 |
| 25th Embodiment | 60 | −200.00 | −189.47 | 20 | 1.5 | 2.32 | −0.71 | 0.24 | −0.08 | 0.30 |
| 26th Embodiment | 60 | ∞ | −1,038.4 | 20 | 1.5 | 0.98 | −0.62 | 0.55 | −0.29 | 0.54 |
| 27th Embodiment | 90 | −100.00 | −114.82 | 20 | 1.5 | 1.91 | −0.18 | −0.00 | 0.39 | 0.15 |
| 28th Embodiment | 90 | −200.00 | −189.47 | 20 | 1.5 | 2.32 | −0.48 | 0.12 | −0.08 | 0.34 |
| 29th Embodiment | 90 | ∞ | −1,038.4 | 20 | 1.5 | 0.98 | −0.52 | 0.44 | −0.29 | 0.66 |
| 30th Embodiment | 120 | −100.00 | −114.82 | 20 | 1.5 | 1.91 | 0.01 | −0.02 | 0.39 | 0.18 |
| 31st Embodiment | 120 | −200.00 | −189.47 | 20 | 1.5 | 2.32 | −0.25 | 0.05 | −0.08 | 0.36 |
| 32nd Embodiment | 120 | ∞ | −1,038.4 | 20 | 1.5 | 0.98 | −0.42 | 0.34 | −0.29 | 0.75 |
| 33rd Embodiment | 150 | −100.00 | −114.82 | 20 | 1.5 | 1.91 | 0.20 | 0.00 | 0.39 | 0.22 |
| 34th Embodiment | 150 | −200.00 | −189.47 | 20 | 1.5 | 2.32 | −0.02 | 0.02 | −0.08 | 0.36 |
| 35th Embodiment | 150 | ∞ | −1,038.4 | 20 | 1.5 | 0.98 | −0.32 | 0.27 | −0.29 | 0.81 |

The lens system for image formation used with the scanning optical system according to the present invention includes at least one single lens having the above-described reflecting surface and transmitting surface and thus, two or more such single lenses may be disposed or combined with other ordinary transmitting lenses. In this case, each lens forming the lens system for image formation may be disposed on a common optic axis or on distinct optic axes.

In the single lens as shown in FIGS. 1 and 2, the arrangement of the incident beam $I_o$ and the single lens becomes a problem in effecting a plurality of reflections within the lens. In a first case, as shown in FIG. 2, the incident beam $I_o$ may be caused to enter the single lens while forming a predetermined angle with the lens. That is, the beam $I_o$ may be caused to obliquely enter the single lens. The surface then formed by the beam leaving the single lens becomes conical. Therefore, to correct the conical surface, a plurality of said single lenses are provided so that the conical surface created by a first single lens by causing a converse conical surface which will offset said conical surface to be created by another single lens provided nearer to the scanning surface than the first single lens. Alternatively, it is possible to cause the incident beam $I_o$ to enter the single lens on a conical surface to thereby correct this conical surface by a conical surface created by the single lens. In a second case, the incident beam $I_o$ may be caused to enter the single lens so as to be parallel to the optic axis of the single lens. In this case, by taking the thickness d of the single lens into account, the beam reflected by the surface $r_2$ may again be reflected by the surface $r_1$. Of course, the lens system used with the scanning optical system according to the present invention may be disposed in whatever position of whatever scanning system as a rule.

Figure 8A:
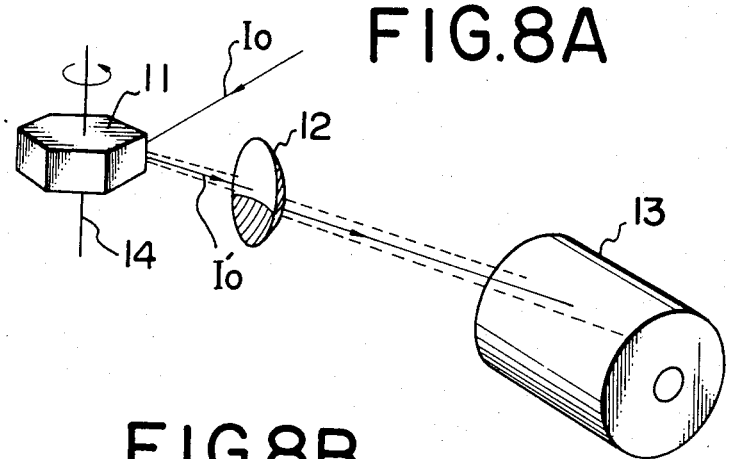
FIGS. 8(A) and (B) show an embodiment of the scanning optical system of the present invention.

FIG. 8(A) is a perspective view schematically showing an embodiment of the scanning optical system using the lens system according to the present invention. The incident beam $I_o$ from an unshown light source is deflected by a rotatable polygon mirror 11 rotated about a rotary shaft 14, and enters the lens system 12 of the present invention and repeats transmission and reflection, whereafter it scans over a photosensitive medium 13.

Figure 8B:
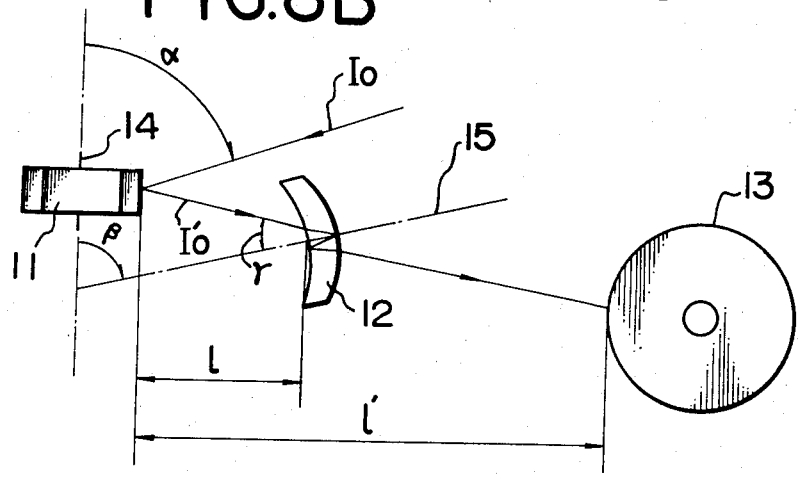

At this time, as shown in FIG. 8(B) which is a cross-sectional view corresponding to FIG. 8(A), the incident beam $I_o$ enters at an angle $\alpha$ with the rotary shaft 14 of the rotatable polygon mirror, and the optic axis 15 of the lens system 12 forms an angle $\beta$ with the aforementioned rotary shaft 14, and the angle $\gamma$ formed between the beam $I_o'$ reflected by the rotatable polygon mirror and the optic axis 15 is $\alpha = \pi - (\alpha + \beta)$. Why the incident beam $I_o$ or the optic axis of the lens system 12 is so inclined is that it facilitates to separate the beam into only one of transmission and reflection at each transmitting surface or reflecting surface of the lens system 12. Another reason is that where the incident beam $I_o$ enters at an angle $\alpha$ with the rotary shaft, it is known that the deflected beam $I_o'$ forms a conical scanning curve and it is possible to make the scanning line on the photosensitive medium 13 into a straight line by suitably selecting the angle $\gamma$ formed between the deflected beam $I_o'$ and the optic axis 15 with respect to the aforementioned angle of incidence $\alpha$.

Figure 9:
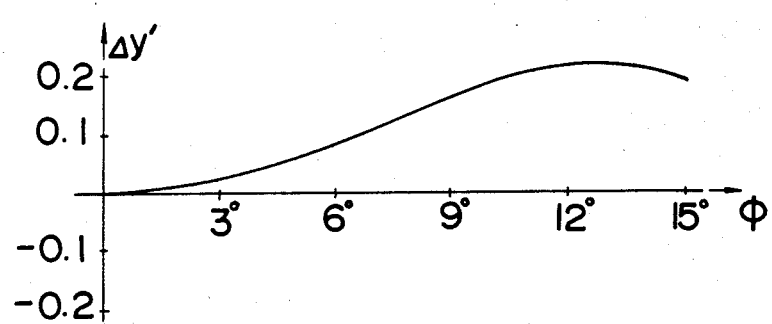
FIG. 9 illustrates the linearity, on the scanned surface, of an embodiment of the scanning image formation lens according to the present invention.

For example, if the distance between the deflecting point on the rotatable polygon mirror and the first surface of the lens 12 in the horizontal direction (the direction perpendicular to the rotary shaft (4) is $\lambda$ and under the arrangement of $\lambda = 86, 31$, $\alpha = 75°$, $\beta = 85°$ and $\lambda = 20°$ and when the lens construction is $R_1 = 739.369$, $R_2 = 384.8753$, $d = 14.78738$ and $N = 1.5$, the linearity of the scanning line on the photosensitive medium surface 13 disposed at a horizontal distance $\lambda' = 300.92$ from the deflecting point is good as shown in FIG. 9. In FIG. 9, the abscissa $\phi$ represents the angle of rotation of the rotatable polygon mirror while the ordinate $\Delta y'$ represents the amount of deviation between the scanning direction on the photosensitive medium surface and the scanning position in the perpendicular direction.

Where a rotatable polygon mirror is used as the deflector as shown in FIG. 8(A), the incident beam $I_o$ entering in a plane containing the optic axis of the lens 12 leads to minimization of the size of the rotatable polygon mirror which in turn leads to an effect that scanning can be done at high speed.

Figure 10:
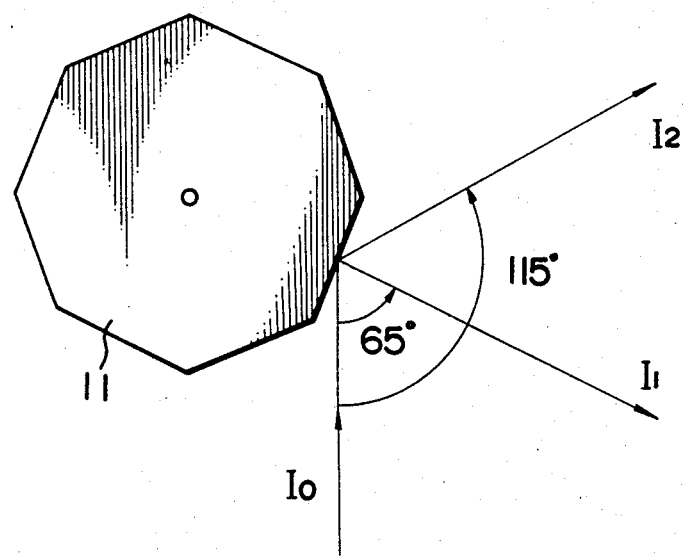
FIG. 10 illustrates the manner in which the size of a rotatable polygon mirror depends on incident beams.

For example, the diameter $\phi$ of the circumscribed circle of a rotatable polygon mirror having N surfaces for deflecting an incident beam having a diameter $\phi$ 5 without the beam being kicked off by the mirror surface is as shown in Table 3 below. In the table, X refers to the case of the present invention and Y shows the diameter of the circumscribed circle, in accordance with the number N of the surfaces, when the angles formed between the incident beam $I_o$ and the deflected beams $I_1$ and $I_2$ in the effective deflection range are 65° and 115°, respectively, as shown in FIG. 10.

TABLE 3

| System N | X | Y |
|---|---|---|
| 8 | 29 | 40 |
| 12 | 115 | 162 |

As can be seen in Table 3, the diameter of the circumscribed circle of the rotatable polygon mirror can be made extremely small in the case of the present invention.

Description will now be made of the distortion in the scanning direction. It is well-known to use f·$\theta$ lens as the scanning lens in order to provide a uniform velocity scanning by the use of a mirror rotated at a uniform angular velocity. It is also well-known that the value of the distortion aberration coefficient V of this f·$\theta$ lens is 0.66667.

According to the lens of the present invention, the values of the distortion aberration coefficients of embodiments 16, 20, 29, 32 and 35 are approximate to that of the f$\theta$ lens.

That of the embodiment shown in FIG. 8(A) is 0.65702 and the beam moves over the photosensitive medium 13 at substantially uniform velocity.

What we claim is:

1. A scanning optical system comprising:
scanning means for deflecting a light beam in a predetermined direction;
a scanning surface scanned by said scanning means; and
an image forming optical system disposed between said scanning means and said scanning surface, said optical system having at least one single lens having its first surface facing said scanning means and its second surface facing said scanning surface, both of said first and second surfaces being divided into a light-transmitting area and a light-reflecting area.

2. A scanning optical system comprising:
scanning means for deflecting a light beam in a predetermined direction;
a light source portion for sending a light beam to said scanning means in a plane parallel to the plane formed by the normal to the deflecting-reflecting surface of said scanning means as the defecting action proceeds;
a scanning surface scanned by the light beam deflected by said scanning means; and
an image forming optical system disposed between said scanning means and said scanning surface, said optical system including at least one single lens having the both surfaces thereof divided into a light-transmitting area and a light-reflecting area.

3. A scanning optical system according to claim 2, wherein the deflection surface formed with time by the light beam deflected by said scanning means is parallel to the optic axis of said single lens.

4. A scanning optical system according to claim 2, wherein the deflection surface formed with time by the light beam deflected by said scanning means forms a predetermned angle with the optic axis of said single lens.

5. A scanning optical system comprising:
scanning means for deflecting a light beam in a predetermined direction;
a light source portion for sending a light beam to said scanning means at a certain angle formed by the normal to the deflecting-reflecting surface of said scanning means as the deflecting action proceeds;
a scanning surface scanned by the light beam deflected by said scanning means;
an image forming optical system disposed between said scanning means and said scanning surface, said optical system having at least one single lens having the both surfaces thereof divided into a light-transmitting area and a light-reflecting area, the optic axis of said single lens forming a certain angle with the light beam deflected by said scanning means.

* * * * *